SR

OR 2,531,509

SEARCH ROOM

Nov. 28, 1950 G. L. GRUNDMANN 2,531,509

SCHMIDT TELEVISION PROJECTION SYSTEM

Filed Sept. 29, 1948 2 Sheets-Sheet 1

T2621

X2057

INVENTOR
Gustave L. Grundmann
BY
ATTORNEY

SEARCH ROO

INVENTOR
Gustave L. Grundmann
BY
[signature]
ATTORNEY

SEARCH ROOM

Patented Nov. 28, 1950 2,531,509

UNITED STATES PATENT OFFICE 2,531,509

SCHMIDT TELEVISION PROJECTION SYSTEM

Gustave L. Grundmann, Westmont, N. J., assignor to Radio Corporation of America, a corporation of Delaware Application September 29, 1948, Serial No. 51,776

6 Claims. (Cl. 88—57)

The present invention relates to a system for projecting images produced by an image producing device, for example, the image producing device of a television receiver, and more particularly, although not necessarily exclusively, to an improved and simplified organization of elements comprising a spherical mirror, an aspheric zone plate, and the image producing surface of a cathode ray tube for projecting an image upon a screen which may be readily located in a preferred position with respect to the organization. In accordance with the invention, the mounting means for the cathode ray tube and the several optical elements of the system are so constructed and so associated together that accurate machine work on any of the parts is not necessary. The invention is also concerned in one of its aspects with methods of adjusting the several parts of the organization with respect to each other in a novel manner.

In United States Patent No. 2,273,801, granted February 17, 1942, to D. O. Landis, there is disclosed an arrangement whereby a spherical mirror or reflecting surface is arranged to direct and focus light rays forming the enlarged television image upon a viewing screen with the aid of an aspheric correcting plate or correcting lens. The organization of essential optical parts shown in this Landis patent must, for best results, be aligned and spaced in a certain definite relationship, and the primary aim of the present invention is to provide novel methods of and means for readily aligning and spacing the essential optical parts.

The second important aim or object is to provide novel adjustable arrangements for supporting and positioning the optical elements of a projector employing reflective optics.

Still another object is to provide novel adjustable means for supporting and positioning a cathode ray tube in an image projecting system.

Figure 1:
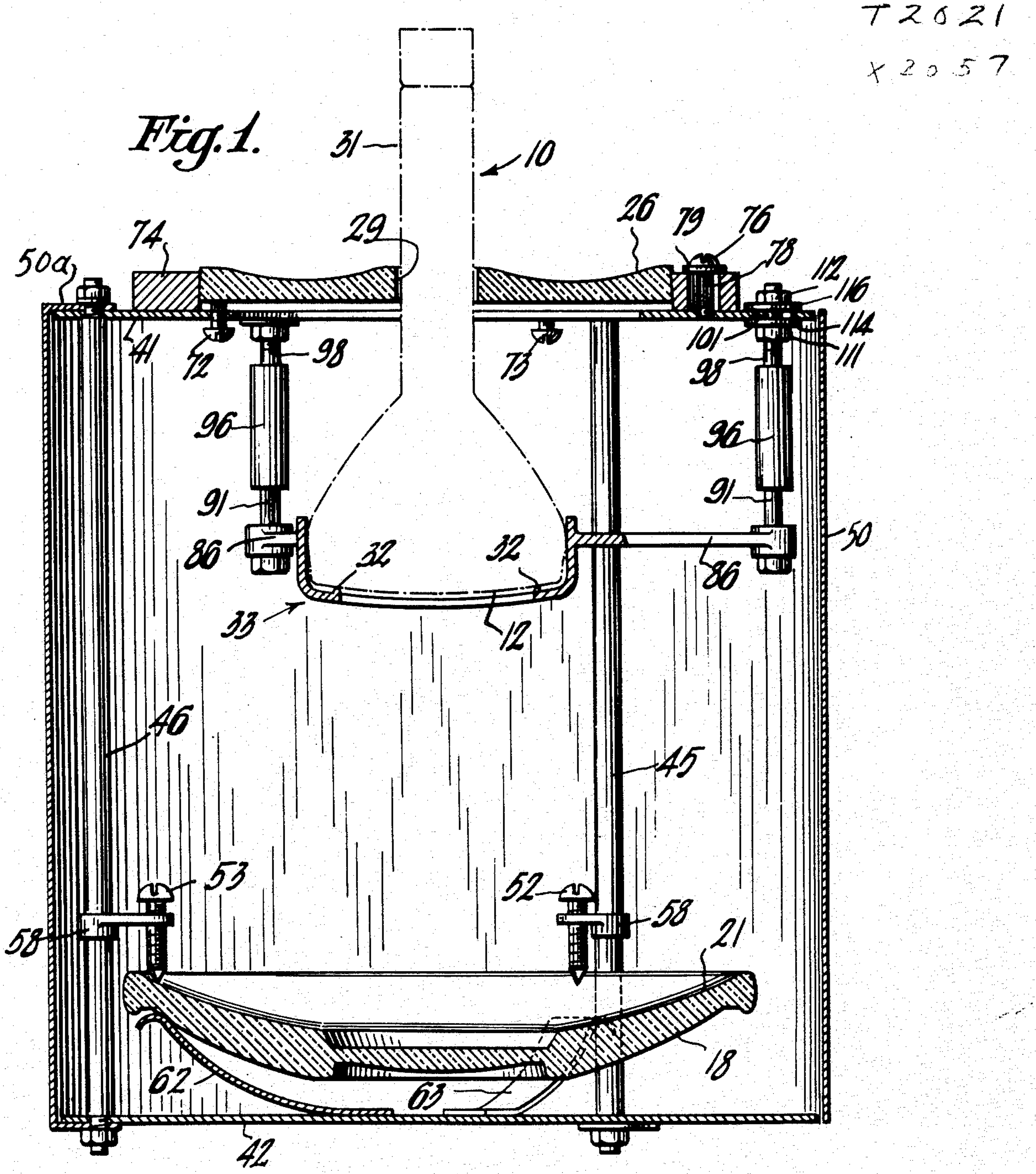
Figure 2:
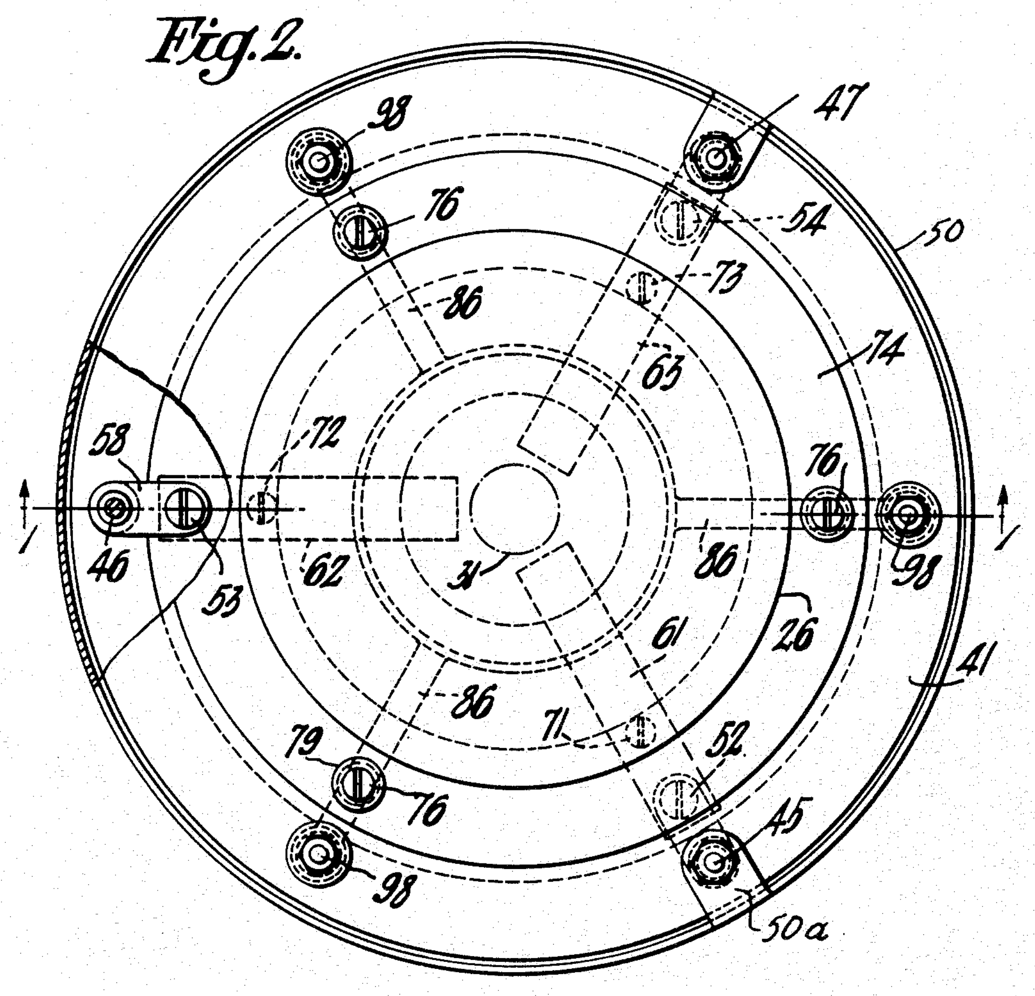

Other objects and advantages of the invention will, of course, become apparent and immediately suggest themselves to those skilled in the art to which the invention is directed from a reading of the following specification in connection with the accompanying drawings in which:

Fig. 1 is a view in sectional elevation of a projection optical system in accordance with the invention showing details of the several parts thereof, the section being taken on line 1—1 of Fig. 2; and Fig. 2 is a top plan view of the apparatus of Fig. 1.

Referring to Fig. 1 of the drawings, which shows the general organization of a television projection system embodying the invention in one of its forms, an image producing tube 10 is indicated in dot-dash outline which is to have a television image produced on its luminescent target on the tube face 12. This tube projects a produced television image or other luminous pattern toward a reflection element 18 which has a spherical reflecting surface 21. The image which has been projected upon the reflecting surface 21 is then reflected therefrom toward a suitable viewing screen (not shown). At an intermediate point in the optical path an aspheric zone plate 26 (also termed a "correcting plate" or "correcting lens") is positioned to receive the light reflected from the reflecting surface 21. The aspheric zone plate 26 is arranged externally to the light path from the tube to the reflector and is preferably axially aligned with each. This zone plate is arranged to correct for any spherical aberrations introduced into any of the light rays by the curved reflecting surface 21 of the member 18 so that a sharply focused reproduction of the image developed on the fluorescent or luminescent target area 12 of the tube 10 is produced on the previously mentioned viewing screen. The aspheric zone plate 26 has a central opening 29 for the purpose of accommodating the tube neck 31 and, if desired, the deflecting yoke (not shown) for producing deflection of the cathode ray beam within the tube 10. The curved face 12 of the tube 10, which will be approximately spherical, or exactly spherical, rests upon projections 32 formed on the ring like tube holder indicated generally by reference character 33. The tube holder 33 will be described more in detail hereinafter. A discussion of the contour of the target face 12 of a tube designed for use in a reflective optical projector is to be found in the previously mentioned Landis patent, No. 2,273,801.

The optical parts 18 and 26 are supported by a frame comprising two end plates 41 and 42 and a plurality of posts 45, 46 and 47 joining these plates. The plate 41 may be regarded as the top plate since the projector (shown by way of example in the drawing) will normally operate in the vertical position as shown by Fig. 1. The posts 45 to 47 are secured in any suitable manner at their ends to the plates 41 and 42. The plates 41 and 42 are preferably parallel as a matter of convenience, although this is not important in view of the adjustable features of the invention to be described hereinafter. A cover 50 may be provided for the projector if desired. Tabs 50a serve to hold the cover to the fastening means for the posts 45 and 47.

The substantially optically correct surface 21 of the spherical mirror 18 is pressed upwardly against the points of three set screws 52, 53 and 54. Each set screw is conveniently threaded into a member 58 one of which is carried by one each of the posts 45 to 47. Since all of the members 58 secured to the posts are similar, the member 58 which is secured to the post 46 will be described by way of example. The member 58 is welded, soldered or otherwise secured to the post 46 above the roughly selected position of the mirror 18. The members 58 are preferably, but not necessarily, all located at the same level. The set screws 52 to 54 are or may be sufficiently long to compensate for differences in location of the members 58.

The points of the three set screws define a circle against which the mirror 18 is pressed by a plurality of springs, three in number designated 61 to 63 in the illustrative example. The springs are secured to the plate 42 and the free end of each spring contacts the convex side of the mirror at a point opposite to the point of contact of a set screw. Both the elevation and location of the center of curvature of the mirror may be adjusted by turning the set screws. The mirror is leveled when its center of curvature is in the optic axis of the system. The manner in which correct optical adjustment of the mirror with respect to other elements of the system is obtained will be described hereinafter.

The correcting plate 26 rests upon the points of three set screws 71, 72 and 73 so that it may be leveled with respect to the mirror 18. Here again, the three points of the set screws combine to define a circle so that the zone plate 26 can be accurately located with respect to the mirror 18. The center of the correcting plate 26 may be located so that the correcting plate is coaxial with the optical axis of the projector by means of a ring 74 within which the correcting plate nests. The ring is secured to the top plate 41 by means of a plurality of clamping screws 76 which are engaged in tapped holes in the top plate 41. Each clamping screw 76 passes through an enlarged aperture 78 in the ring so that the ring may slide around to various positions on the top plate 41. The manner in which the correcting plate 26 is to be centered will be described hereinafter. After the correcting plate is properly located with respect to optical axis of the system, the clamping screws 76 may be tightened on washers 79 to hold the correcting plate 26 in its desired position.

The face 12 of the cathode ray tube 10 which has the desired optical curvature to function with the spherical surface 21 of the mirror 18 and the correcting plate 26 rests upon the projections 32 of the tube holder 33 as previously described. This tube holder is generally cup shaped as shown and is provided with three radial projections 86. Each projection 86 is connected to the end of an insulated rod as shown by the drawings. Three, which is the optimum number of these rods, all of which are designated 91, are employed in the illustrative example. The structure of one of these rods 91 will be described in detail and this description will suffice for all three rods as they are similar. The rod 91 is secured into the end of an insulator 96. The rod 98, the end of which is secured in the insulator 96 serves as a continuation of the rod 91 and is threaded at its end. The top plate receives the end of the rod 98 in an enlarged aperture 101 so as to afford considerable clearance for the end of the rod. The enlarged apertures 101 in the top plate which receive the rods 98 provide for lateral freedom of movement of the tube holder 33 while its position is being adjusted. Each rod 98 is clamped in position by means of two nuts 111 and 112 which engage washers 114 and 116 disposed on either side of the plate 41.

For adjusting a projector embodying the invention the following procedure is recommended:

The aspheric correcting plate 26 is placed in the ring 74 and on the screws 71 to 73. Light is passed from an overhead light source (not shown) through the correcting plate 26 onto the spherical mirror 18. The latter is held against the set screws 52 to 54 by the pressure of the springs 61 to 63. The screws 52 to 54 are adjusted to image the neck aperture 29 on the correcting plate itself. This procedure aligns the correcting plate 26 and the mirror 18 and also provides the desired optical spacing of these optical elements.

The entire structure may be leveled to provide a reference plane for the further adjustments which are to be carried out. This may be done by placing a level (not shown) such as a spirit level across the rim of the mirror 18 and using wedges (not shown) or other suitable means for leveling the device. This method of leveling machinery and the like is well known so that no further discussion need be given. Since the mirror is spherical, its edge will be circular thus providing a reference plane for the level. The level is then to be transferred to the correcting plate 26 so that it may be leveled by use of the screws 71 to 73. With the level now on the top rim of the tube support it can be leveled by adjusting the effective length of the rods 91. A test lamp (not shown) having its face curved to conform to the face 12 of the tube 10 to be used is inserted in the holder 33 with this face resting on the projections 32 and an image of the face of the test lamp is projected on a screen (not shown). The Landis patent referred to above indicates the geometry of a projector employing a spherical mirror and correcting plate when it is used with a screen. Adjustment is thus completed in an easy and effective manner.

The invention claimed is:

1. A projector for projecting luminous images presented on the face of a cathode ray tube comprising; a mirror having a spherical reflecting surface, an aspheric correcting lens means to carry said correcting lens, said means forming the top of said projector, means for radially positioning said lens in a desired position, said last named means being movably carried by said lens carrying means, means on said lens carrying member for leveling said lens, end forming means forming the opposite end of said projector, spacing means for spacing and joining said end forming means and said lens carrying means, mirror positioning means associated with said spacing means, and means for yieldably urging the spherical reflecting surface of said mirror against said mirror positioning means. ///

2. A projector for projecting luminous images presented on the face of a cathode ray tube comprising; a mirror having a spherical reflecting surface, an aspheric correcting lens, lens carrying means to carry said correcting lens, said means forming the top of said projector, means for radially positioning said lens in a desired position, said last named means being movably carried by said lens carrying means, means on said lens carrying member for leveling said lens, and a plate member forming the bottom of said projector, posts spacing and joining said plate member and said lens carrying means, a plurality of set screw means carried by said posts, and means for urging the spherical reflecting surface of said mirror against said set screws.

3. A projector for projecting luminous images presented on the face of a cathode ray tube comprising; a mirror having a spherical reflecting surface, an aspheric correcting lens, means to carry said correcting lens, said means forming the top of said projector, means for radially positioning said lens in a desired position, said last named means being movably carried by said lens carrying means, means on said lens carrying member for leveling said lens, and a plate member forming the opposite end of said projector, posts spacing and joining said plate member and said lens carrying means, brackets, one of which is secured to each of said posts, a set screw threaded into each of said brackets, and means for urging the spherical reflecting surface of said mirror against said set screws.

4. A projector for projecting luminous images presented on the face of a cathode ray tube comprising; a mirror having a spherical reflecting surface, an aspheric correcting lens, a supporting plate member for said correcting lens forming the top of said projector, a ring on said plate member within which said correcting lens is nested, means for clamping said ring in a desired position on said plate member, screw means threaded in said plate member on which said correcting lens rests to provide a leveling adjustment for the lens, a second plate member forming the opposite end of said projector, means for spacing and joining said plate members, brackets carried by said last named means for engaging the spherical reflecting surface of said mirror, screw threaded into each of said brackets, and resilient means for urging the spherical reflecting surface of said mirror into contact with said reflecting surface engaging means.

5. A projector for projecting luminous images presented on the face of a cathode ray tube comprising; a mirror having a spherical reflecting surface, an aspheric correcting lens, a supporting plate member for said correcting lens forming the top of said projector, a ring on said plate member within which said correcting lens is nested, means for clamping said ring in a desired position on said plate member, screw means threaded in said plate member on which said correcting lens rests to provide a leveling adjustment for the lens, a second plate member forming the opposite end of said projector, posts spacing and joining said plate members, brackets, one of which is secured to each of said posts, a set screw threaded into each of said brackets, and means for urging the spherical reflecting surface of said mirror against said set screws.

6. The projector of claim 5 wherein said means for urging the spherical reflecting surface of said mirror against the set screws comprises a plurality of flat springs secured at one end to the second plate member.

GUSTAVE L. GRUNDMANN.

REFERENCES CITED

The following references are of record in the file of this patent:

UNITED STATES PATENTS

| Number | Name | Date |
|---|---|---|
| 2,424,513 | Stephan | July 22, 1947 |
| 2,453,003 | Edwards | Nov. 2, 1948 |
| 2,455,476 | Epstein | Dec. 7, 1948 |
| 2,467,185 | Cady | Apr. 12, 1949 |

OTHER REFERENCES

Electronics, April 1948, pages 72–77.